United States Patent
Lee et al.

(10) Patent No.: US 12,326,895 B2
(45) Date of Patent: Jun. 10, 2025

(54) ENABLING AN EFFICIENT UNDERSTANDING OF CONTENTS OF A LARGE DOCUMENT WITHOUT STRUCTURING OR CONSUMING THE LARGE DOCUMENT

(71) Applicant: Notion Labs, Inc., San Francisco, CA (US)

(72) Inventors: Linus Lee, San Francisco, CA (US); He Lu, San Francisco, CA (US); Lu Li, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 18/503,961

(22) Filed: Nov. 7, 2023

(65) Prior Publication Data
US 2025/0147999 A1    May 8, 2025

(51) Int. Cl.
*G06F 16/00* (2019.01)
*G06F 16/338* (2019.01)
*G06F 16/34* (2019.01)
*G06F 16/353* (2025.01)

(52) U.S. Cl.
CPC .......... *G06F 16/353* (2019.01); *G06F 16/338* (2019.01); *G06F 16/345* (2019.01)

(58) Field of Classification Search
None
See application file for complete search history.

(56) References Cited

U.S. PATENT DOCUMENTS

| | | | | |
|---|---|---|---|---|
| 2010/0281020 A1* | 11/2010 | Drubner | ............... | G06F 16/245 707/769 |
| 2011/0145150 A1* | 6/2011 | Onischuk | ............... | G06Q 30/08 705/50 |
| 2011/0258198 A1* | 10/2011 | Sun | ....................... | G06F 16/337 707/742 |
| 2013/0124467 A1* | 5/2013 | Naidu | .................... | G06F 16/22 707/610 |
| 2014/0172684 A1* | 6/2014 | Wolfe, Jr. | .............. | G06Q 10/10 705/38 |

(Continued)

OTHER PUBLICATIONS

International Search Report and Written Opinion dated Sep. 18, 2024 cited in PCT/2024/035790, 17 pages.

*Primary Examiner* — Hasanul Mobin
(74) *Attorney, Agent, or Firm* — Perkins Coie LLP; Alberto Araiza; Lena Petrovic

(57) ABSTRACT

The system obtains a record in a database and a property associated with the record in the database, where the record includes a large document, and where the large document is unstructured or semi-structured. The system receives an input indicating a type of analysis to perform associated with the record and performs, using an artificial intelligence, the analysis associated with the record to obtain an output. The type of analysis to obtain the output includes generating a document describing contents of the record, where the document describing the contents of the record is smaller than the record. The system stores the output as the property in the database and enables access to the database based on the property, thereby enabling an efficient understanding of contents of the document without consuming the document.

20 Claims, 9 Drawing Sheets

(56) References Cited

U.S. PATENT DOCUMENTS

| | | | | |
|---|---|---|---|---|
| 2014/0365281 | A1* | 12/2014 | Onischuk | G07C 13/00 |
| | | | | 705/12 |
| 2015/0012339 | A1* | 1/2015 | Onischuk | G07C 13/00 |
| | | | | 235/386 |
| 2017/0109005 | A1* | 4/2017 | Adachi | G06F 3/0482 |
| 2017/0142249 | A1* | 5/2017 | Shinar | H04L 12/2832 |
| 2018/0316696 | A1* | 11/2018 | Takata | G06F 11/34 |
| 2018/0350180 | A1* | 12/2018 | Onischuk | G07C 13/00 |
| 2020/0225655 | A1* | 7/2020 | Cella | G05B 23/0221 |
| 2020/0334276 | A1* | 10/2020 | Conway | G16B 50/00 |
| 2020/0348662 | A1* | 11/2020 | Cella | G05B 19/41865 |
| 2021/0157312 | A1* | 5/2021 | Cella | G01M 13/045 |
| 2021/0232726 | A1* | 7/2021 | Isaacs | G06F 9/451 |
| 2022/0058234 | A1* | 2/2022 | Schneider | G06Q 50/184 |
| 2022/0092095 | A1* | 3/2022 | Shukla | G06F 16/34 |
| 2022/0108262 | A1* | 4/2022 | Cella | G05B 17/02 |
| 2022/0254462 | A1* | 8/2022 | Austring | G16H 10/60 |
| 2024/0202600 | A1* | 6/2024 | Poirier | G06F 16/345 |

\* cited by examiner

| ☐ Name | ☐ Read? | ≡ Tags | ≡ Summary [AI] | ≡ Takeaway [AI] | + ... |
|---|---|---|---|---|---|
| ☐ the boy and the pond _700_ | ☒ | Story Life 740 750 _702_ | A boy who dreams of finding something special in the pond by his house spends his days watching and waiting until a fisherman teaches him to fish. Eventually, the boy learns to swim but is hesitant to go deeper until the fisherman falls into the pond and the boy leaps in to save him. In that moment, the boy experiences the pond in a new way and no longer watches and waits for something special, but instead fishes and swims with the fisherman. _704_ | Sometimes, it's better to take a leap of faith and try something new, rather than just watch and wait for something special to happen. _706_ | |
| ☐ Lessons on design _710_ | ☒ | Interface design Product design _712_ | Design is about creating strong frameworks, framing designs to make reasoning visible, prioritizing consistency, embracing change, and seeking joy in work. These lessons can be applied to interface and product design. Consistency is the most important technical skill for a digital product designer, and designers should strive for progress and change. The real legacy of a designer is the impact they have on people around them. Courtesy, giving credit, and celebrating others are important in design, and designers should seek joy in being together. | The one lesson to take away from this essay is that design is a team sport and the real legacy of a designer is the impact they have on the people around them, how much they help them grow, and how they make them feel when working together. _716_ | |
| ☐ Model compression | ☒ | AI 760 Interface design 770 Strategy 780 | Model compression allows for effective solutions to be shared without burdening others with the full diversity of the model, but compressed models can be brittle in the face of change. This problem can be solved through software engineering solutions such as warranties, redundancies, and repair facilities. The ability to compress and share models is a crucial aspect of our technological world, but it is important to recognize the limitations of compressed models and address them through software engineering solutions. | The ability to compress and share models might just be the single most important gift that humanity was given. | |
| ☐ Emergent tool use from multi-agent interaction _720_ | ☐ | AI Reinforcement learning _722_ | Through training in a simulated hide-and-seek environment, agents build a series of six distinct strategies and counterstrategies, some of which were previously unknown. The self-supervised emergent complexity in this simple environment suggests that multi-agent co-adaptation may produce extremely complex and intelligent behavior. The agents learn complex tool use through self-play and Proximal Policy Optimization, and large-scale training is critical for agents to progress through the various stages of emergence. _724_ | Multi-agent co-adaptation may produce extremely complex and intelligent behavior. _726_ | |

_705_ { (rows 1–2)  
_715_ { (row 3)  
_725_ { (row 4)

← Fill "Takeaway" with AI

Fill with ≡ Key info ⟩
Auto-update on page edits

What key info to extract?

What's the one lesson I should take away from this essay? Make the sentence punchy and creative. Be concise. Bold the important words. _730_

Undo    Save changes

✱ Update all pages
🗑 Turn off AI autofill
ⓘ Learn about AI autofill

*FIG. 7*

ENABLING AN EFFICIENT UNDERSTANDING OF CONTENTS OF A LARGE DOCUMENT WITHOUT STRUCTURING OR CONSUMING THE LARGE DOCUMENT

BACKGROUND

Knowledge workers are often inundated with many documents that they need to make sense of efficiently. For example, salespeople may need to quickly understand a long list of prospective customers; designers may need to make sense of hundreds of user interviews to identify key takeaways or requests; engineers may need to digest multiple technical specifications, bug reports, and tasks; managers of large teams may need to navigate dozens of long documents, projects plans, and meeting notes inside a team. In collaborative environments, these kinds of documents often change constantly, adding to the problem.

BRIEF DESCRIPTION OF THE DRAWINGS

Detailed descriptions of implementations of the present invention will be described and explained through the use of the accompanying drawings.

FIG. 7 shows the document and multiple properties stored in the database.

Figure 1:
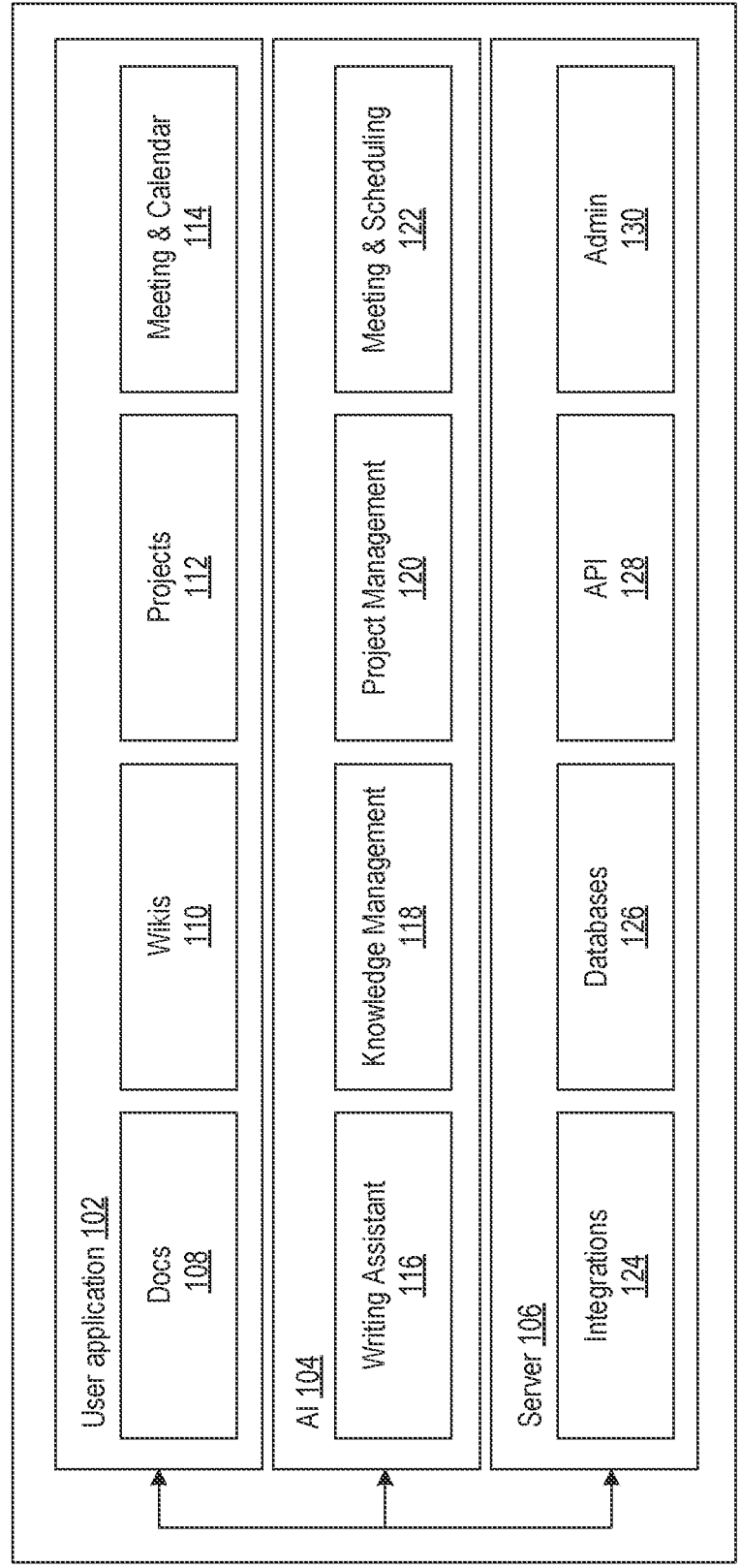
FIG. 1 is a block diagram of an example platform.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method obtain a record in a database and a property associated with the record in the database. The property can be text or one or more tags belonging to a set of predetermined categories. The record can include a large text document over 3,000 words. The large text document is unstructured or semi-structured. In other words, the large text document is not a spreadsheet such as an Excel file but a document containing any type of unstructured or semi-structured data. The system receives an input indicating a type of analysis to perform associated with the record, and performs, using a large language model, the analysis associated with the record to obtain an output.

The type of analysis belongs to multiple categories including summarizing, extracting, generating, and translating. When summarizing the record, the large language model produces the output including a summary. When extracting indicated information from the record, the large language model produces the output including the indicated information. When extracting the information, the large language model does not generate new words or concepts based on the document and only includes words contained in the record. When generating a second document based on the large text document, the large language model produces the output including the second document, where the second document includes contents not included in the large text document, and where the second document is smaller than the large text document. The second document can be a social media post generated by the large language model such as a generative artificial intelligence. When translating, the large limit model can translate at least a portion of the large text document into another language, including a different natural language or a programming language.

The system stores the output as the property in the database and enables access of the database based on the property, thereby enabling an efficient understanding of contents of the large text document without structuring the large text document or requiring the user to consume the large text document.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

System Overview

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some examples, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, and a meeting and calendar template 114. In some examples, a user can generate, save, and share customized templates with other users.

The user application 102 templates can be based on content "blocks." For example, the templates of the user application 102 include a pre-defined and/or pre-organized set of blocks that can be customized by the user. Blocks are content containers within a template that can include text, images, objects, tables, maps, and/or other pages (i.e., sub-pages). Blocks can be assigned to certain properties. For example, a block can be assigned as a heading block or a sub-heading block having a specific location and style to assist in organizing a page. A block can be assigned as a list block to include content in a list format. A block can be assigned as an AI prompt block that enables a user to provide instructions to the AI tool 104 to perform functions. A block can also be assigned to include audio, video, or image content.

A user can add, edit, and remove content from the blocks. The user can also organize the content within a page by moving the blocks around. In some examples, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The AI tool 104 is an integrated AI assistant that enables AI-based functions for the user application 102. The AI tool 104 is based on a neural network architecture, such as the transformer 212 described in FIG. 2. The AI tool 104 can interact with blocks embedded within the templates of the user application 102. For example, the AI tool 104 can include a writing assistant tool 116, a knowledge management tool 118, a project management tool 120, and a meeting and scheduling tool 122. The different tools of the AI tool 104 can interact with different blocks and templates of the user application 102.

The writing assistant tool 116 can operate as a generative AI for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name your pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some examples, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units that enable the operations of the AI tool 104 and the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 is configured to communicate the block data between the user application 102, the AI tool 104, and the databases 126. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
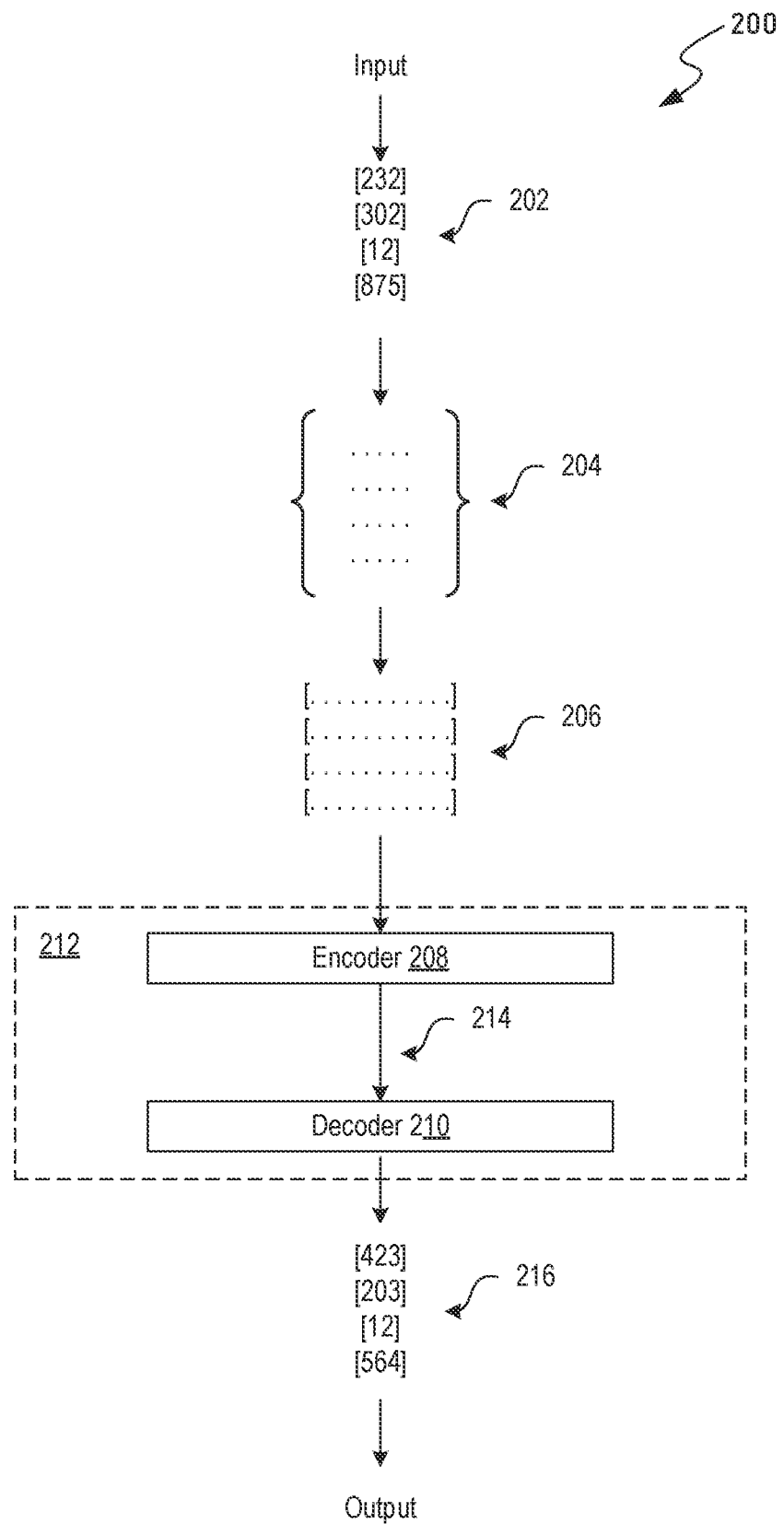
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 212 includes an encoder 208 (which can comprise one or more encoder layers/blocks connected in series) and a decoder 210 (which can comprise one or more decoder layers/blocks connected in series). Generally, the encoder 208 and the decoder 210 each include a plurality of neural network layers, at least one of which can be a self-attention layer. The parameters of the neural network layers can be referred to as the parameters of the language model.

The transformer 212 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns, etc.) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 2 illustrates an example of how the transformer 212 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph, etc.), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for simplicity. In general, the token sequence that is inputted to the transformer 212 can be of any length up to a maximum length defined based on the dimensions of the transformer 212. Each token 202 in the token sequence is converted into an embedding vector 206 (also referred to simply as an embedding 206). An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some examples, the numerical value of the token 202 can be used to look up the corresponding embedding in an embedding matrix 204 (which can be learned during training of the transformer 212).

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as the latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 is able to generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some examples, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to a question, text associated with a request, or a list of ideas associated with a request. For example, the input can include the question "What is the weather like in Australia?" and the output can include a description of the weather in Australia. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/ cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 3:
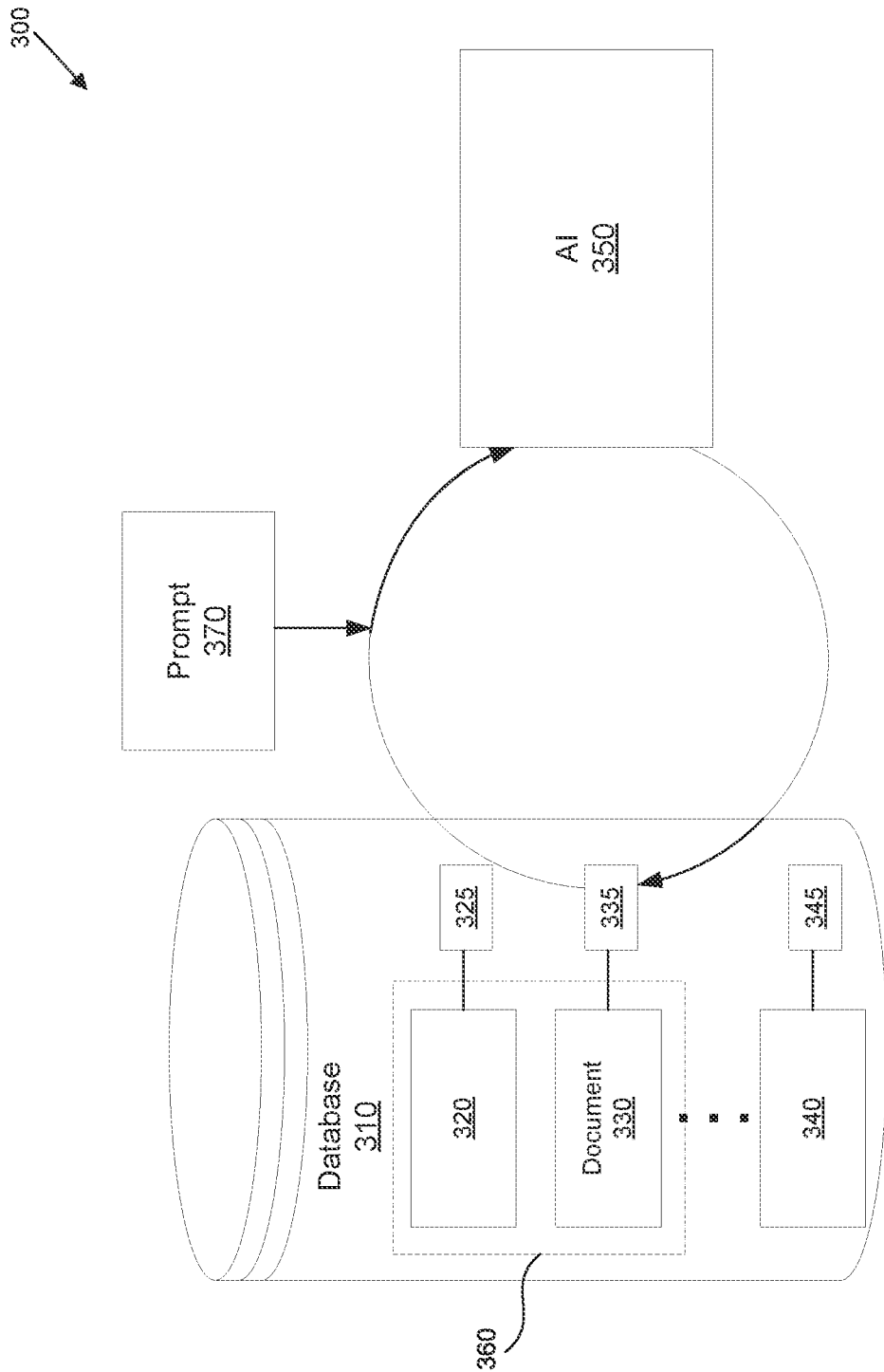
FIG. 3 shows a system to enable an efficient understanding of contents of a large document.

Enabling an Efficient Understanding of Contents of a Large Document without Structuring or Consuming the Large Document FIG. 3 shows a system to enable an efficient understanding of contents of a large document. The system 300 includes a database 310 storing multiple large unstructured documents 320, 330, 340 (only three shown for brevity), multiple properties 325, 335, 345 (only three labeled for brevity), and an AI 350, such as a large language model.

Reading and understanding each document would consume a significant amount of time for a person who may only have a limited amount of time to devote to the task. The documents 320, 330, 340 are free form and are thus unstructured. Specifically, the documents 320, 330, 340 are not spreadsheets and instead can include unstructured data such as meeting notes, interviews, transcripts of meetings, images including PDFs, audio, video, three-dimensional geometry, etc. The documents 320, 330, 340 can be large, over 3,000 words, and can take some time for a reader to consume.

Consequently, the AI 350 can analyze one or more documents 320, 330, 340 at the same time and produce a condensed representation of the document stored in the properties 325, 335, 345. The memory occupied by the properties 325, 335, 345 storing the condensed representation is smaller than the memory occupied by the corresponding documents 320, 330, 340, respectively. The properties 325, 335, 345 can be text, an image including a PDF, video, audio, three-dimensional geometry, etc. The properties 325, 335, 345 can also include one or more tags, as described in this disclosure.

The AI 350 can perform bulk analysis on multiple documents 320, 330, 340. The number of documents can exceed 10,000 documents.

For example, the prompt, i.e., an input 370 indicating the type of analysis to perform, can state "give me a list of companies that are mentioned in the document." When the AI 350 is performing bulk analysis on the documents 320, 330, 340, some documents might not contain a company name. As a result, the output that the AI 350 produces for the documents not containing any companies can include a blank field, or a gibberish output that is not indicative of the fact that the document does not contain a company name. For example, the gibberish output can be a hallucinated name of a company that does not actually exist in the document. Further, the AI 350 performing bulk analysis can take several hours to complete for all the documents. As a result, performing bulk analysis can take several hours and not produce a misleading output at the end of the several hours.

Consequently, the system 300 can run a test analysis and analyze a representative sample 360 of all the documents 320, 330, 340. The representative sample 360 can include considerably fewer documents than the full set of documents, for example, five documents. The AI 350 can analyze the representative sample based on the prompt, e.g. input, 370 "give me a list of companies that are mentioned in the document" and produce the test output stored in the properties 335, 345. The user can check the test output to determine whether there is any gibberish. If there is gibberish, such as a hallucinated company name, the user can update the prompt to give explicit instructions on the action to perform if no information is found in the document. For example, the updated prompt can state "give me a list of companies that are mentioned in the document. If there are no companies mentioned in the document, return a blank." Based on the updated prompt, the AI 350 can perform the analysis on all the documents 320, 330, 340.

Once the properties 325, 335, 345 are updated based on the analysis performed by the AI 350, the properties are stored in the database 310. An important benefit of storing the properties 325, 335, 345 in the database 300 is that the properties can transform the information in the document into a more normalized/structured form. For example, a prompt "State whether the meeting in this doc is an 'engineering team meeting' or a 'staff meeting' based on topics discussed" may enable the user to search and filter for all eng-related meetings, even if the meeting notes themselves did not include the word "Engineering" anywhere.

In addition, the system 300 can then search the database 310 based on the properties 325, 335, 345. For example, if the AI 350 generated a summary of the documents and stored it in the properties 325, 335, 345, the system 300 can search the database 310 for the document that contains requested keywords, such as "human resources," in the summary and provide the documents to the user. By searching the summaries, as opposed to searching the full documents 320, 330, 340, the system 300 can produce the results much faster.

Further, the system 300 can filter the database 310 based on the properties 325, 335, 345. For example, the database 310 can store information about 10,000 customers. The system 300 receives a query regarding which customers have the title "machine learning engineer." The AI 350 can extract what the customer's title is out of the 10,000 documents and put the titles in properties 325, 335, 345. The system 300 can then add a filter to the database 310 that says "only show me documents having 'machine learning engineer'" in the properties 325, 335, 345.

Figure 4:
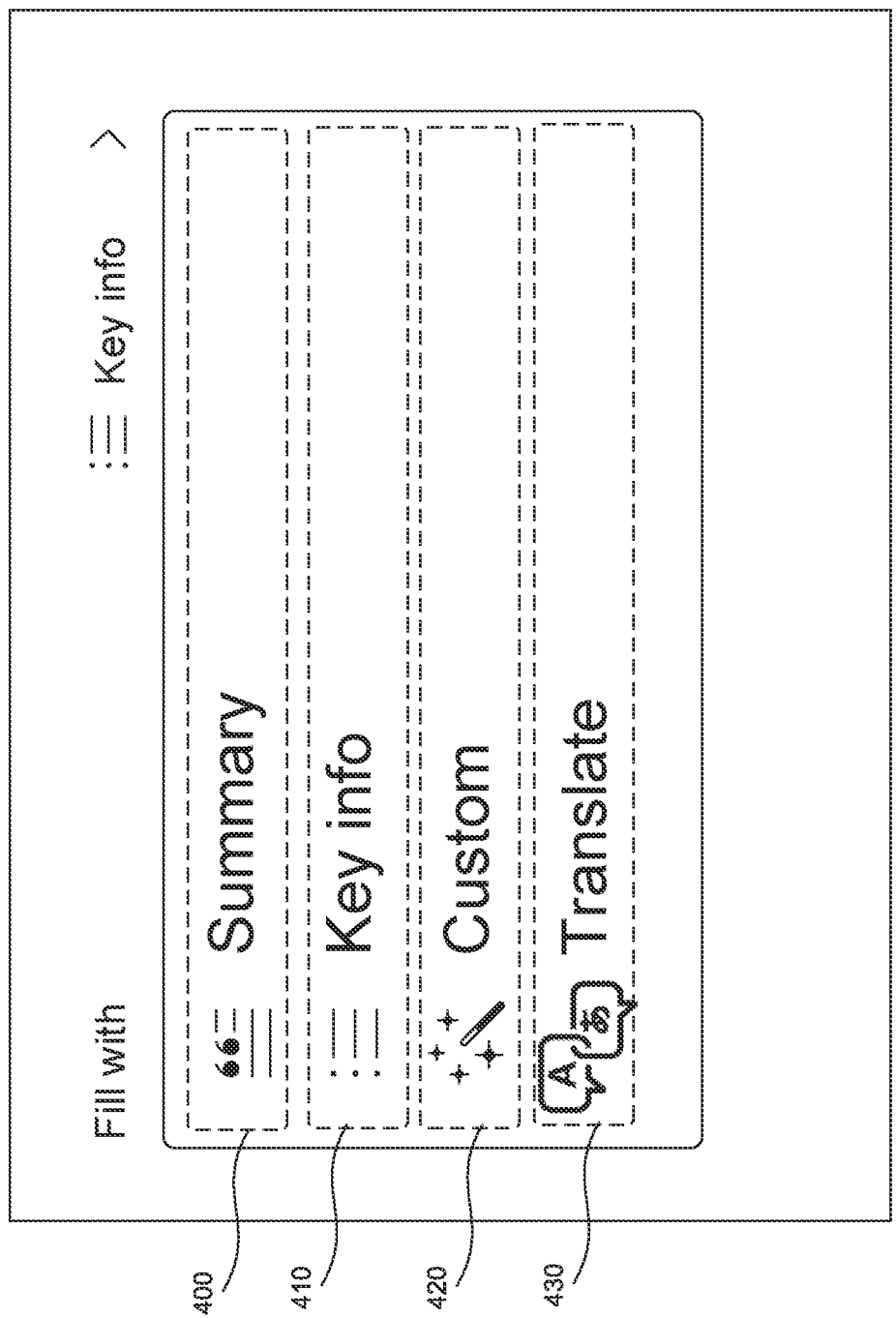
FIG. 4 shows various types of analysis that can be performed on the documents in the database.

FIG. 4 shows various types of analysis that can be performed on the documents 320, 330, 340 in FIG. 3 in the database 310 in FIG. 3. The types of analysis that the AI 350 in FIG. 3 can perform on the documents 320, 330, 340 can include summary 400, key information 410, custom 420, and/or translation 430. In addition, other types of analysis can be defined and prepackaged prompts, corresponding to a type of analysis, made available to a user to select.

The summary 400 analysis receives a prepackaged prompt that indicates to the AI 350 to summarize the contents and properties of documents 320, 330, 340 in the database 310. The summary 400 can be triggered manually or automatically upon changes, as explained in this disclosure. For example, when the summary 400 analysis is selected, the AI 350 can analyze a 20,000-word document and produce an output stating "planning for the use of two latency optimization techniques: local storage and pre-filtering."

The key information 410 analysis receives a prepackaged prompt that extracts words and descriptions from the documents 320, 330, 340. In other words, the AI 350 running the key information 410 analysis can generate a property containing words already in the documents 320, 330, 340 without generating new words or content. For example, the key information 410 analysis can extract action items from meeting notes, extract whether the issue is with a mobile platform or a desktop platform from a bug report, extract customer names from a sales meeting, etc. Applying the key information 410 analysis, the AI 350 can receive a narrowly focused free-form prompt in the form of a question that aims exclusively at surfacing an answer with high confidence, based solely on the content of the document. As with summary 400 analysis, the key information 410 analysis can be triggered manually or automatically upon changes, as explained in this disclosure. For example, the input to the key information 410 analysis can state "does this task focus on a specific persona? If so, which of the persona?" The output of the analysis can state "knowledge worker." In another example, the input to the key information 410 analysis can state "what is the customer's archetype?" The output of the analysis can state "software development enterprise."

The custom 420 analysis receives an open-ended, natural language input where users can fill in any prompt for the AI 350. The input can be a free-form prompt, similar to extract, but with no strongly opinionated expectation around the output. In other words, the AI 350 performing the custom 420 analysis can generate new content including words and concepts based on the content contained in the documents 320, 330, 340. As with summary 400 analysis, and the key information 410 analysis, the custom 420 analysis can be triggered manually or automatically upon changes, as explained in this disclosure. In some embodiments, the input can be limited to 3,000 tokens, e.g., words, while the output can be limited to 1,000 tokens, e.g., words. For example, the input to the custom 420 analysis can state "write a tweet describing the content of the document, with 2 creative hashtags." The output of the analysis can state "we're so excited that AI properties are coming in April, we have a long plan, and can't wait to share with you all #Databases #NotionAI new feature-translation of the whole document or parts of the document."

The system 300 can also track the usage of various analysis 400, 410, 420 using various success criteria. The first success criteria can be adoption indicated by a percentage of active workspaces associated with a database having AI properties. The second success criteria can be depth of usage indicated by a percentage of databases associated with workplace spaces having an AI property added.

Figure 5:
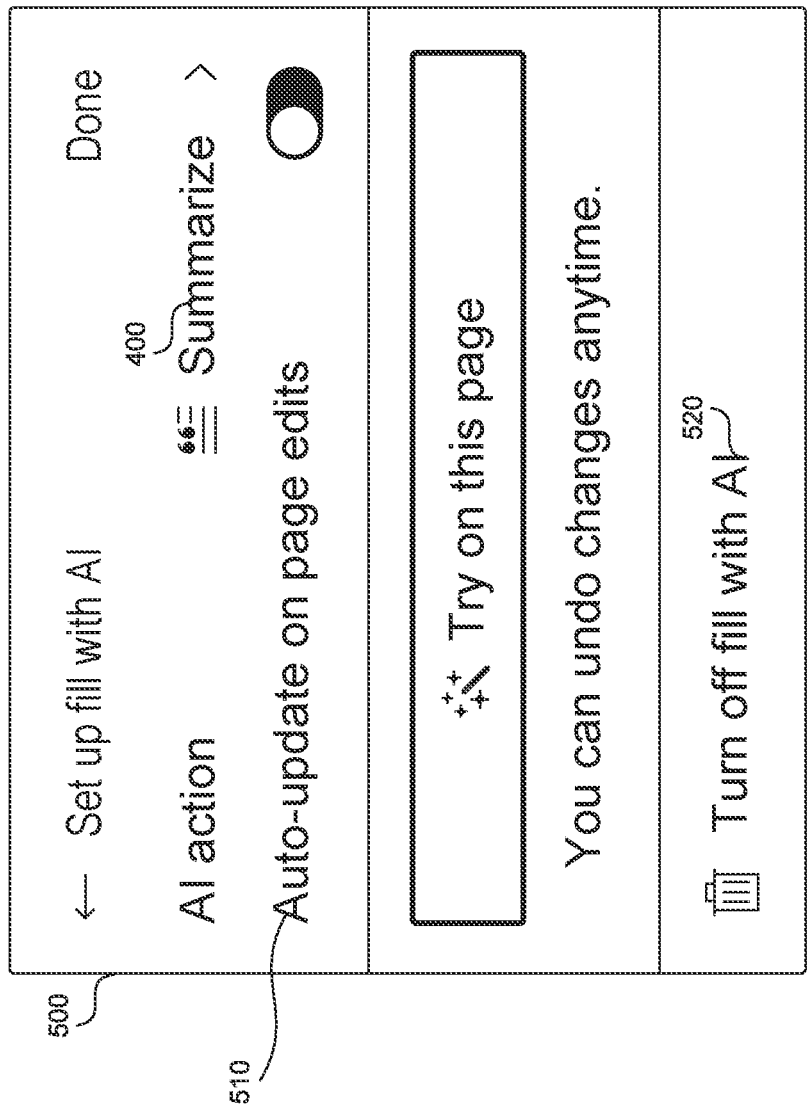
FIG. 5 shows various options associated with the summary analysis.

FIG. 5 shows various options associated with the summary analysis. Once the user selects summary 400 analysis, the menu 500 appears, providing additional options associated with the summary 400 analysis.

Option 510 "auto-update on page edits" when turned on enables the AI 350 in FIG. 3 to automatically update the property containing the summary based on the edited, e.g., modified, document. In one embodiment, when the option 510 is turned to auto-update, the user cannot edit the property containing the summary. In another embodiment, when the option 510 is turned to auto update, the user can edit AI auto-filled values, however, the user's editing then turns off auto-updating for that page. To avoid continuous AI 350 computation, there is a predetermined time buffer, e.g., a predetermined time lag, between the edit and the activation of the AI 350 computation. The predetermined time lag can be five minutes or more.

Option 510, when turned off, sets the updates to manual updates. When the option 510 is turned off, the user can manually edit the contents of the AI-enabled property or click an update button to trigger the AI 350 to recompute the property containing the summary.

Selecting option 520 "turn off fill with the AI" can disable the AI 350 from performing the computation again.

Figure 6:
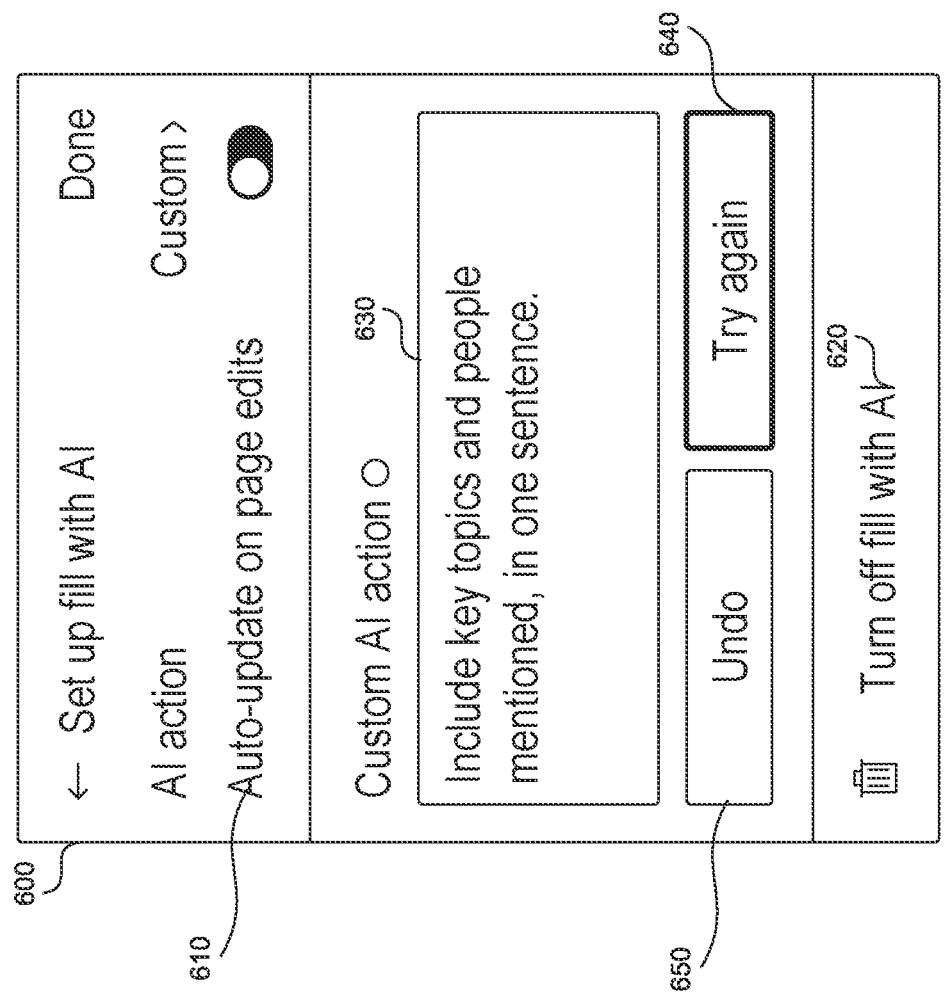
FIG. 6 shows the various options associated with the custom analysis.

FIG. 6 shows the various options associated with the custom analysis. Once the user selects custom 420 analysis, the menu 600 appears, providing additional options associated with the custom 420 analysis.

As explained above, option 610 "auto-update on page edits" when turned on enables the AI 350 in FIG. 3 to automatically update the property containing the custom 420 analysis based on the edited, e.g., modified, document. When the option 610 is turned to auto-update, the user cannot edit the property containing the custom analysis. To avoid continuous AI 350 computation, there is a predetermined time buffer, e.g., a predetermined time lag, between the edit and the activation of the AI 350 computation. The predetermined time lag can be five minutes or more.

Option 610, when turned off, sets the updates to manual updates. When the option 610 is turned off, the user can manually edit the contents of the AI-enabled property or click an update button to trigger the AI 350 to recompute the property containing the summary.

Selecting option 620 "turn off fill with the AI" can disable the AI 350 from performing the computation again.

The custom 420 analysis includes an option, enabling a free-form natural language input 630 such as "include key topics and people mentioned in one sentence." The input 630 is provided to the AI 350 and specifies the format of the output produced by the AI.

The option "try again" 640, when selected, provides the same input to the AI 350 and requests a new output. The option "undo" 650 clears the natural language input 630.

FIG. 7 shows the document and multiple properties stored in the database. The database 310 in FIG. 3 can include multiple documents 700, 710, 720 (only three labeled for brevity). Each document 700, 710, 720 can have one or more AI-generated properties 702, 704, 706, 712, 714, 716, 722,

724, 726, which can be stored in the same records 705, 715, 725 in the database or in a record associated with the document.

For example, the AI 350 in FIG. 3 can fill the properties 704, 714, 724 with a summary of the documents 700, 710, 720, respectively. Additionally, the AI 350 can fill the properties 706, 716, 726 with a custom prompt 730 stating "what the one lesson I should take away from this essay?"

Sometimes, the output contained in the properties 706, 704, 716, 714, 726, 724 can be quite long. To shorten the output, the prompt 730 can also include an extra condition expressed as a statement "make the sentence punchy and creative. Please be concise." In addition, the prompt 730 can also include instruction "bold the important words." Consequently, the AI 350 can bold certain words in the output contained in the properties 706, 716, 726.

In addition to text, the properties 702, 712, 722 can be one or more tags 740, 750, 760, 770, 780 (only five labeled for brevity). The tags 740, 750, 760, 770, 780 can describe an attribute related to the documents 700, 710, 720. For example, tags 740, 750 can describe the document 700 as related to "story" and "life." The tags 760, 770, 780 can describe document 710 as related to "AI," "interface design," and "strategy." In another example, the documents 700, 710, 720 can describe artists, and the tags 740, 750, 760, 770, 780 can describe one or more genres to which the artist belongs.

The user can specify whether the AI 350 can create brand-new tags. If this setting is enabled, the AI 350 can create new tags. If the setting is disabled, the AI 350 is constrained to existing tags.

If the AI is constrained to existing tags, the tags 740, 750, 760, 770, 780 belong to a set of predetermined categories, and the AI 350 has to produce an output belonging to the set of predetermined categories. Consequently, unlike with unstructured properties 706, 704, 716, 714, 726, 724, when generating tags 740, 750, 760, 770, 780, the AI 350 is constrained to produce an output in the set of predetermined categories. If the AI 350 produces an output that is not in one of the predetermined categories, the output is invalid.

To ensure that the output is valid, when the AI 350 is generating tags 740, 750, 760, 770, 780, the AI can rely on history. For example, the AI 350 can receive previous documents and their corresponding tags and can determine an existing pattern of how documents 700, 710, 720 are tagged in the database 310.

For example, the documents 700, 710, 720 can be bug reports, the tags can be various teams that can address the bug reports. The AI 350 can analyze the prior history of assigning bug reports to teams, and based on the prior history, can determine which new bugs to assign to which teams. In a more specific example, a new bug report can be about a particular feature, and the AI 350 by analyzing the database 310 can determine that bugs regarding the particular feature are assigned to a particular team. Consequently, the AI 350 can assign the new bug report to the particular team.

In addition to being text documents, the documents 700, 710, 720 can include images, video, audio, three-dimensional geometry, etc. For example, the documents 700, 710, 720 can be photos of receipts and the properties 702, 704, 706, 712, 714, 716, 722, 724, 726 can be the total on the receipt. In another example, the documents 700, 710, 720 can be vacation photos, and the properties 702, 704, 706, 712, 714, 716, 722, 724, 726 can be the people in the photos or the location in the photos. The AI 350 can perform a similar function for other inputs including video, audio, three-dimensional geometry etc. In addition to being tags or texts, the properties 702, 704, 706, 712, 714, 716, 722, 724, 726 can be another multimedia format such as images, video, audio, three-dimensional geometry, etc.

Figure 8:
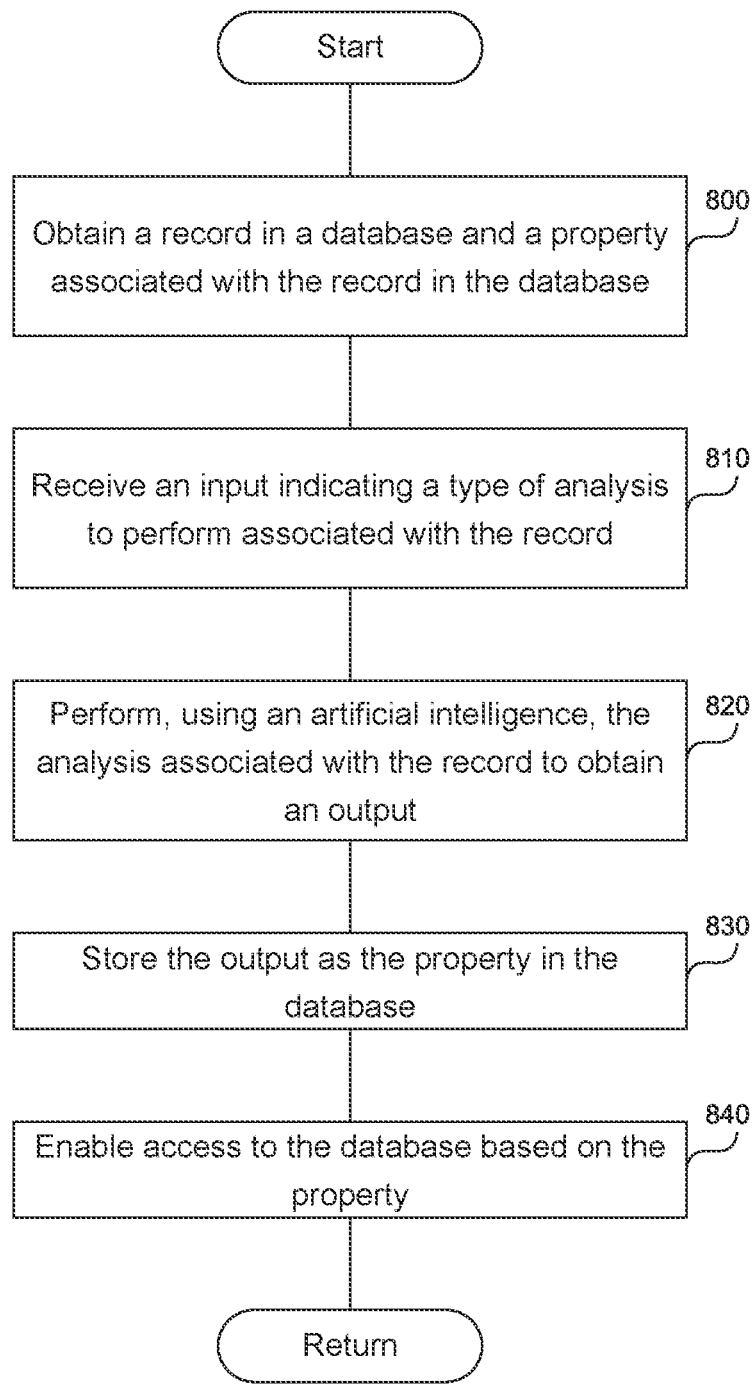
FIG. 8 is a flowchart of a method to enable an efficient understanding of contents of the document without consuming the document.

FIG. 8 is a flowchart of a method to enable an efficient understanding of contents of the document without consuming the document. A hardware or software processor executing instructions describing this application can, in step 800, obtain a record in a database and a property associated with the record in the database. The property can be text or one or more tags, as described in this disclosure. The record can include a large unstructured or semi-structured document. The document can be a text over 3,000 words. For example, the record is not a spreadsheet structured with columns and rows or tables and instead is meeting notes, interviews, meeting recordings, etc. In addition, the record can include audio, video, images, etc. The processor can use the property to extract information out of the unstructured documents like meeting transcripts, meeting notes, or interviews.

Semi-structured data is a form of structured data that does not obey the tabular structure of data models associated with relational databases or other forms of data tables, but nonetheless contains tags or other markers to separate semantic elements and enforce hierarchies of records and fields within the data. Therefore, it is also known as self-describing structure. In semi-structured data, the entities belonging to the same class may have different attributes even though they are grouped together, and the attributes' order is not important. XML, other markup languages, email, and EDI are all forms of semi-structured data.

JSON or JavaScript Object Notation, is an open standard format that uses human-readable text to transmit data objects consisting of attribute-value pairs. It is used primarily to transmit data between a server and web application, as an alternative to XML. JSON has been popularized by web services developed utilizing REST principles.

There is a new breed of databases such as MongoDB and Couchbase that store data natively in JSON format, leveraging the pros of semi-structured data architecture In step 810, the processor can receive an input indicating a type of analysis to perform associated with the record.

In step 820, the processor can perform, using an artificial intelligence such as a large language model, the analysis associated with the record to obtain an output. The type of analysis to obtain the output includes generating a document describing contents of the record, where the document describing the contents of the record is smaller than the record. In addition, the type of analysis can belong to multiple categories including summarizing, extracting, generating, and translating. Specifically, summarizing analysis can summarize the record to obtain the output including a summary. Extracting analysis can extract indicated information from the record to obtain the output including the indicated information. The extracting analysis does not create new words, phrases, or content based on the record. The generating analysis can generate a second document based on the large document, e.g. large text document, to obtain the output including the second document, where the second document includes content not included in the large text document, and where the second document is smaller than the large text document. The second document can be generated by a generative AI and can produce new content based on the document. For example, the second document can be a social media post generated in response to "generate a social media post that is punchy and creative. Use novel hashtags." The translating analysis can translate at least a portion of the large text document into another natural language or a programming language.

In step 830, the processor can store the output as the property in the database. In step 840, the processor can enable access to the database based on the property, thereby enabling an efficient understanding of contents of the document without consuming the document and without structuring the document.

The processor can obtain the property, where the property is associated with multiple categories, such as tags. The property indicates that the output of the analysis needs to fall into one of the multiple categories. The processor can receive the input indicating the type of analysis to perform. The processor can obtain from the database multiple records associated with multiple properties, where each property among the multiple properties is generated using the type of analysis. Based on the multiple records and the multiple properties, the processor can determine a pattern of correspondence between the multiple properties and the multiple records. Based on the pattern of correspondence, the processor can determine the output, where the output falls into one of the multiple categories. This feature can be useful in assigning bugs to different teams inside a company. The processor can determine the patterns in the database, and based on the patterns, assign tags to new documents.

The processor can search or filter the database based on the property. The processor can obtain multiple records including the record in the database and multiple properties including the property associated with the multiple records in the database, where each property among the multiple properties is generated using the same type of analysis. The processor can receive a search query and can search the multiple properties based on the search query to produce a list of relevant results. The processor can provide the list of relevant results.

To extract indicated information from the record, the processor can provide a predetermined category of the type of analysis to perform associated with the record, where the predetermined category includes extract indicated information. The processor can provide an entry for a natural language input modifying the predetermined category. The natural language input can request information to extract from the record. The processor can receive a first input indicating to perform the predetermined category of the analysis and a second input including the natural language input modifying the predetermined category. Based on the natural language input and the predetermined category, the processor can perform the predetermined category of the analysis. Upon performing the predetermined category of the analysis, the processor can produce the output indicating the requested information.

To generate the summary, the processor can provide a predetermined category of the type of analysis to perform associated with the record. The processor can receive the input indicating to perform the predetermined category of the type of analysis. The processor can perform the predetermined category of analysis.

The processor can automatically update the property upon modification of the document. The processor can determine whether the record in the database is modified after the analysis is performed. Instead of updating the property every time the record is modified, to reduce the consumption of computational resources, the processor can wait a predetermined amount of time, such as five minutes, before updating the property. Upon determining that the record in the database is modified after the analysis is performed, the processor can automatically repeat a performance of the analysis to obtain a second output. The processor can store the second output as the property in the database.

The processor can perform bulk editing of multiple records. The processor can receive an indication to perform the type of analysis on multiple records in the database. The processor can obtain from the database the multiple records on which to perform the type of analysis. The processor can select a subset of the multiple records, where the subset of the multiple records is a representative sample of the multiple records. The processor can perform the type of analysis on each record among the subset of the multiple records to obtain multiple outputs because performing the type of analysis in each record among the subset of the multiple records requires less time than performing the type of analysis on each record among the multiple records. The processor can provide the multiple outputs. An operator, such as a user or another artificial intelligence, can receive the multiple outputs and determine whether the outputs are satisfactory. If the outputs are not satisfactory, the operator can modify the input, e.g., the prompt, to the artificial intelligence.

Computer System

Figure 9:
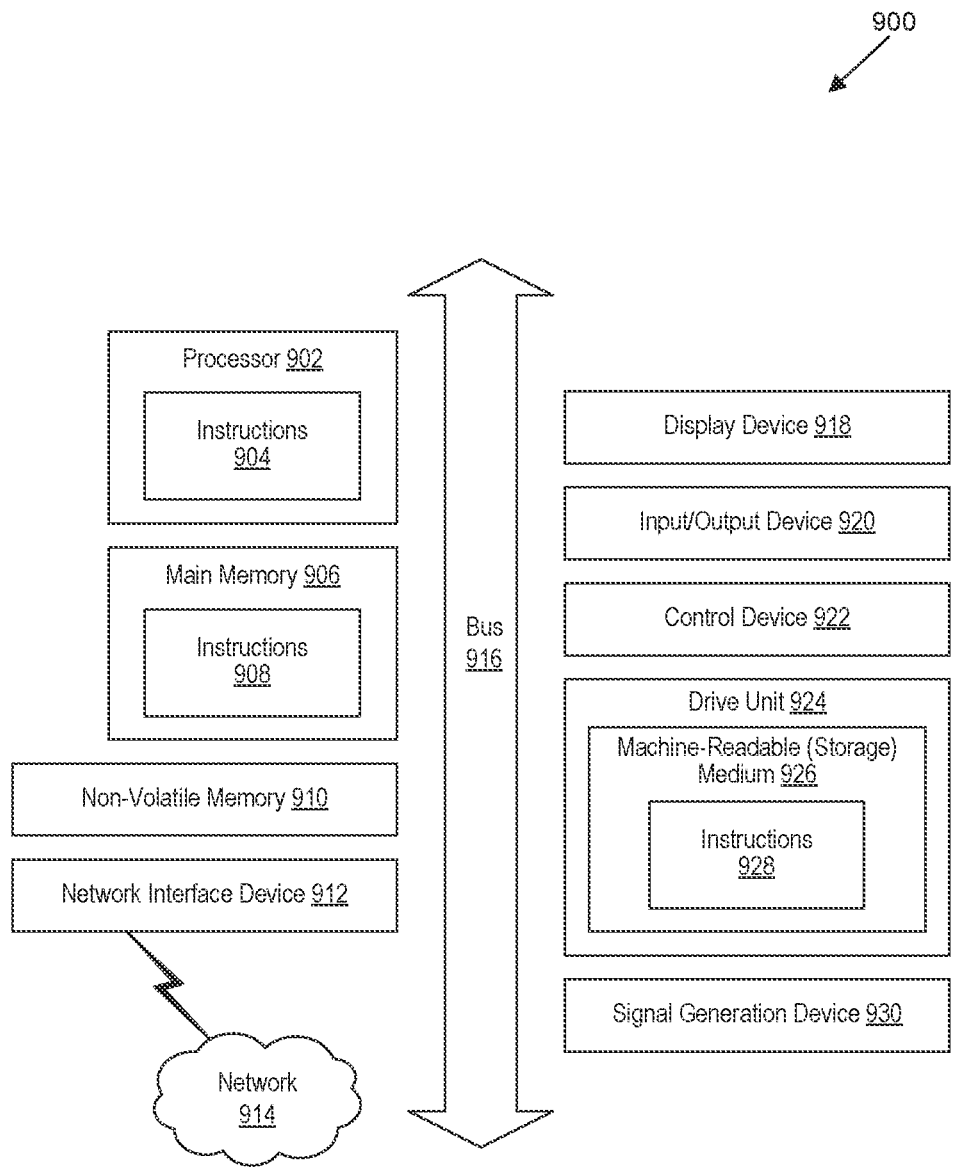
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions when executed by at least one data processor of a system cause the system to:
obtain multiple records from a database,
wherein a record among the multiple records includes a large document comprising text, and
wherein the large document is unstructured or semi-structured;
receive an input indicating a type of analysis to perform associated with the record;
obtain a property associated with the record in the database,
wherein the property includes a property name and a property value;
prior to performing the analysis on the multiple records in the database, obtain a subset of the multiple records,
wherein the subset of the multiple records includes fewer records than the multiple records;
perform the analysis on the subset of the multiple records to obtain a subset of results,
wherein performing the analysis on the subset of the multiple records is faster than performing the analysis associated with the multiple records;
provide the subset of results to a user to inspect,
wherein the subset of results includes an incorrect result;
receive from the user a modification to the input to obtain a modified input targeted at eliminating the incorrect result;
perform, using a large language model and the modified input, the analysis associated with the multiple records to obtain an output,
wherein the type of analysis to obtain the output belongs to multiple categories including:
summarizing the record to obtain the output including a summary;
extracting indicated information from the record to obtain the output including the indicated information;
generating a second document based on the large document to obtain the output including the second document,
wherein the second document includes contents not included in the large document, and
wherein the second document is smaller than the large document; and
store the output as the property value in the database; and
present the record, the property name and property value, thereby enabling an efficient understanding of contents of the large document without structuring the large document or consuming the large document.

2. The non-transitory, computer-readable storage medium of claim 1, comprising instructions to:
obtain the property,
wherein the property is associated with multiple categories, and
wherein the property indicates that the output of the analysis falls into one of the multiple categories;
receive the input indicating the type of analysis to perform;
obtain, from the database, multiple records associated with multiple properties, wherein each property among the multiple properties is generated using the type of analysis;
based on the multiple records and the multiple properties, determine a pattern of correspondence between the multiple properties and the multiple records; and
based on the pattern of correspondence, determine the output, wherein the output falls into one of the multiple categories.

3. The non-transitory, computer-readable storage medium of claim 1, comprising instructions to:
obtain multiple records including the record in the database and multiple properties including the property associated with the multiple records in the database,
wherein each property among the multiple properties is generated using the type of analysis;
receive a search query;
search the multiple properties based on the search query to produce a list of relevant results; and
provide the list of relevant results.

4. The non-transitory, computer-readable storage medium of claim 1, wherein instructions to extract the indicated information from the record to obtain the output comprise instructions to:
provide a predetermined category of the type of analysis to perform associated with the record,
wherein the predetermined category includes the extracting of indicated information;
provide an entry for a natural language input modifying the predetermined category,
wherein the natural language input requests information to extract from the record;
receive a first input indicating to perform the predetermined category of the analysis and a second input including the natural language input modifying the predetermined category;
based on the natural language input and the predetermined category, perform the predetermined category of the analysis; and
upon performing the predetermined category of the analysis, produce the output indicating the requested information.

5. The non-transitory, computer-readable storage medium of claim 1, comprising instructions to:
provide a predetermined category of the type of analysis to perform associated with the record;
receive the input indicating to perform the predetermined category of the type of analysis; and
perform the predetermined category of the type of analysis.

6. The non-transitory, computer-readable storage medium of claim 1, comprising instructions to:
determine whether the record in the database is modified after the analysis is performed;

upon determining that the record in the database is modified after the analysis is performed, automatically repeat a performance of the analysis to obtain a second output; and store the second output as the property in the database.

7. The non-transitory, computer-readable storage medium of claim 1, comprising instructions to:

receive an indication to perform the type of analysis on multiple records in the database;

obtain from the database the multiple records on which to perform the type of analysis;

select a subset of the multiple records,
wherein the subset of the multiple records is a representative sample of the multiple records;

perform the type of analysis on each record among the subset of the multiple records to obtain multiple outputs,
wherein performing the type of analysis in each record among the subset of the multiple records requires less time than performing the type of analysis on each record among the multiple records; and provide the multiple outputs.

8. A method comprising:

obtaining multiple records from a database,
wherein a record among the multiple records includes a large document, and
wherein the large document is unstructured or semi-structured;

receiving an input indicating a type of analysis to perform associated with the record;

obtaining a property associated with the record in the database,
wherein the property includes a property name and a property value;

prior to performing the analysis on the multiple records in the database, obtaining a subset of the multiple records,
wherein the subset of the multiple records includes fewer records than the multiple records;

performing the analysis on the subset of the multiple records to obtain a subset of results,
wherein performing the analysis on the subset of the multiple records is faster than performing the analysis associated with the multiple records;

providing the subset of results to a user to inspect,
wherein the subset of results includes an incorrect result;

receiving from the user a modification to the input to obtain a modified input targeted at eliminating the incorrect result;

performing, using an artificial intelligence and the modified input, the analysis associated with the multiple records to obtain an output,
wherein the type of analysis to obtain the output comprises generating a document describing contents of the record, and
wherein the document describing the contents of the record is smaller than the record;

storing the output as the property value in the database; and present the record, the property name and property value, thereby enabling an efficient understanding of contents of the large document without consuming the large document.

9. The method of claim 8, comprising:

obtaining the property,
wherein the property is associated with multiple categories, and
wherein the property indicates that the output of the analysis falls into one of the multiple categories;

receiving the input indicating the type of analysis to perform;

obtaining, from the database, multiple records associated with multiple properties, wherein each property among the multiple properties is generated using the type of analysis;

based on the multiple records and the multiple properties, determining a pattern of correspondence between the multiple properties and the multiple records; and based on the pattern of correspondence, determine the output,
wherein the output falls into one of the multiple categories.

10. The method of claim 8, comprising:

obtaining multiple records including the record in the database and multiple properties including the property associated with the multiple records in the database,
wherein each property among the multiple properties is generated using the type of analysis;

receiving a search query;

searching the multiple properties based on the search query to produce a list of relevant results; and providing the list of relevant results.

11. The method of claim 8, wherein extracting indicated information from the record to obtain the output comprises:

providing a predetermined category of the type of analysis to perform associated with the record,
wherein the predetermined category includes the extracting of indicated information;

providing an entry for a natural language input modifying the predetermined category,
wherein the natural language input requests information to extract from the record;

receiving a first input indicating to perform the predetermined category of the analysis and a second input including the natural language input modifying the predetermined category;

based on the natural language input and the predetermined category, performing the predetermined category of the analysis; and upon performing the predetermined category of the analysis, producing the output indicating the requested information.

12. The method of claim 8, comprising:

determining whether the record in the database is modified after the analysis is performed;

upon determining that the record in the database is modified after the analysis is performed, automatically repeating a performance of the analysis to obtain a second output; and storing the second output as the property in the database.

13. The method of claim 8, comprising:

receiving an indication to perform the type of analysis on multiple records in the database;

obtaining from the database the multiple records on which to perform the type of analysis;

selecting a subset of the multiple records,
wherein the subset of the multiple records is a representative sample of the multiple records;

performing the type of analysis on each record among the subset of the multiple records to obtain multiple outputs,
wherein performing the type of analysis in each record among the subset of the multiple records requires less time than performing the type of analysis on each record among the multiple records; and providing the multiple outputs.

14. A system comprising:

at least one hardware processor; and at least one non-transitory memory storing instructions, which, when executed by the at least one hardware processor, cause the system to:
  obtain multiple records from a database,
    wherein a record among the multiple records includes a large document, and
    wherein the large document is unstructured or semi-structured;
  receive an input indicating a type of analysis to perform associated with the record;
  obtain a property associated with the record in the database,
    wherein the property includes a property name and a property value;
  prior to performing the analysis on the multiple records in the database,
    obtain a subset of the multiple records,
      wherein the subset of the multiple records includes fewer records than the multiple records;
  perform the analysis on the subset of the multiple records to obtain a subset of results,
    wherein performing the analysis on the subset of the multiple records is faster than performing the analysis associated with the multiple records;
  provide the subset of results to a user to inspect,
    wherein the subset of results includes an incorrect result;
  receive from the user a modification to the input to obtain a modified input targeted at eliminating the incorrect result;
  perform, using an artificial intelligence and the modified input, the analysis associated with the multiple records to obtain an output,
    wherein the type of analysis to obtain the output comprises translating at least a portion of the large document into a different language including a natural language or a programming language;
  store the output as the property value in the database; and
  present the record, the property name and property value, thereby enabling an efficient understanding of contents of the large document without consuming the large document.

15. The system of claim 14, comprising instructions to:
obtain the property,
  wherein the property is associated with multiple categories, and
  wherein the property indicates that the output of the analysis falls into one of the multiple categories;
receive the input indicating the type of analysis to perform;
obtain, from the database, multiple records associated with multiple properties, wherein each property among the multiple properties is generated using the type of analysis;
based on the multiple records and the multiple properties, determine a pattern of correspondence between the multiple properties and the multiple records; and
based on the pattern of correspondence, determine the output,
  wherein the output falls into one of the multiple categories.

16. The system of claim 14, comprising instructions to:
obtain multiple records including the record in the database and multiple properties including the property associated with the multiple records in the database,
  wherein each property among the multiple properties is generated using the type of analysis;
receive a search query;
search the multiple properties based on the search query to produce a list of relevant results; and
provide the list of relevant results.

17. The system of claim 14, wherein instructions to extract indicated information from the record to obtain the output comprise instructions to:
provide a predetermined category of the type of analysis to perform associated with the record,
  wherein the predetermined category includes extract indicated information;
provide an entry for a natural language input modifying the predetermined category,
  wherein the natural language input requests information to extract from the record;
receive a first input indicating to perform the predetermined category of the analysis and a second input including the natural language input modifying the predetermined category; and
based on the natural language input and the predetermined category, perform the predetermined category of the analysis; and
upon performing the predetermined category of the analysis, produce the output indicating the requested information.

18. The system of claim 14, comprising instructions to:
provide a predetermined category of the type of analysis to perform associated with the record;
receive the input indicating to perform the predetermined category of the type of analysis; and
perform the predetermined category of analysis.

19. The system of claim 14, comprising instructions to:
determine whether the record in the database is modified after the analysis is performed;
upon determining that the record in the database is modified after the analysis is performed, automatically repeat a performance of the analysis to obtain a second output; and
store the second output as the property in the database.

20. The system of claim 14, comprising instructions to:
receive an indication to perform the type of analysis on multiple records in the database;
obtain from the database the multiple records on which to perform the type of analysis;
select a subset of the multiple records,
  wherein the subset of the multiple records is a representative sample of the multiple records;
perform the type of analysis on each record among the subset of the multiple records to obtain multiple outputs,
  wherein performing the type of analysis in each record among the subset of the multiple records requires less time than performing the type of analysis on each record among the multiple records; and
provide the multiple outputs.

* * * * *